(12) United States Patent  
Eckert et al.

(10) Patent No.: US 7,950,293 B2  
(45) Date of Patent: May 31, 2011

(54) METHOD FOR MEASURING FLOW RATES IN LIQUID MELTS

(75) Inventors: Sven Eckert, Dresden (DE); Gunter Gerbeth, Dresden (DE); Thomas Gundrum, Ullersdorf (DE)

(73) Assignee: Helmholtz-Zentrum Dresden, Rossendorf e.V., Dresden (DE)

( * ) Notice: Subject to any disclaimer, the term of this patent is extended or adjusted under 35 U.S.C. 154(b) by 0 days.

(21) Appl. No.: 12/664,283

(22) PCT Filed: Jun. 10, 2008

(86) PCT No.: PCT/EP2008/057195  
§ 371 (c)(1),  
(2), (4) Date: May 18, 2010

(87) PCT Pub. No.: WO2008/152025  
PCT Pub. Date: Dec. 18, 2008

(65) Prior Publication Data  
US 2010/0218617 A1    Sep. 2, 2010

(30) Foreign Application Priority Data

Jun. 11, 2007  (DE) .......................... 10 2007 027 392

(51) Int. Cl.  
*G01F 1/58* (2006.01)

(52) U.S. Cl. .................................................. 73/861.12
(58) Field of Classification Search .... 73/861.6–861.29, 73/338, 584, 664, 91, 93  
See application file for complete search history.

(56) References Cited

U.S. PATENT DOCUMENTS 4,770,699 A * 9/1988 Mountford ...................... 75/583  
4,981,045 A * 1/1991 Mountford ...................... 73/644  
* cited by examiner

*Primary Examiner* — Jewel Thompson  
(74) *Attorney, Agent, or Firm* — Laurence A. Greenberg; Werner H. Stemer; Ralph E. Locher

(57) ABSTRACT

The invention relates to a method for measuring flow rates in liquid melts in a temperature range above 200 DEG C. using an ultrasonic generator and to an associated ultrasonic waveguide according to the ultrasonic Doppler method. The aim of the invention is to provide good signal incoupling and outcoupling. This is achieved by the preparation of the wettability of the end face of the ultrasonic waveguide before the measuring operation, subsequent direct incoupling of ultrasonic measuring signals into the melt at an angle that is not equal to 90 DEG, achieved by the immersion of the end face of the ultrasonic waveguide into the melt, outcoupling of the ultrasonic signals reflected in the melt via the end face of the ultrasonic waveguide and routing of said signals to an evaluation circuit. To prepare the wettability of the end face, the latter is mechanically and chemically cleaned and subsequently coated with a suitable material.

11 Claims, 2 Drawing Sheets

METHOD FOR MEASURING FLOW RATES IN LIQUID MELTS

BACKGROUND OF THE INVENTION

Field of the Invention

The invention relates to a method for measuring the local flow rate in liquid melts in a temperature range above 200° C. using an ultrasound generator and an associated ultrasonic waveguide based on the ultrasonic Doppler method.

No methods which could be used to determine local flow rates in hot melts with a sufficient degree of accuracy are known according to the prior art. Hot melts such as liquid metals or semiconductors are non-transparent. For this reason, optical measuring methods are restricted solely to free surfaces of the melts. In practice, floats, for example, are placed on the free surface and the movement of said floats is tracked. Invasive methods in which test specimens are immersed in the melt and the action of force on these specimens is measured or the dissolution rate of the material is determined are known.

These methods generally constitute significant intervention and interference with the respective process, which cannot be ignored, and only provide very rough measured values.

Correlation measuring methods are also known. For example, it is possible to track temperature fluctuations over a particular measurement path. The propagation time of the signals provides a value for the rate between two measuring points. However, this result cannot be interpreted as a local measured value on account of the required distance between the measuring points.

In contrast to the optical measuring methods which are widespread in fluid mechanics, the ultrasonic measuring methods are, in principle, suitable for use in non-transparent fluids. The fundamental component of the measuring apparatus is the ultrasonic transducer in the form of a piezoelectric crystal (also called piezoelectric transducer) which is electrically connected to a frequency generator and an evaluation device. The ultrasonic transducer transmits the ultrasonic waves into the fluid to be examined directly or via the outer wall of the container surrounding the fluid.

Ultrasonic flowmeters for determining the flow rate of flowing media in tubes or channels are widespread. The document DE 198 12 458 C2 describes a transmitting and/or receiving head for an ultrasonic flowmeter which is based on the propagation time method and is distinguished by the use of an ultrasonic waveguide with a high heat conduction resistance. The use of an ultrasonic waveguide to transmit ultrasonic signals makes it possible to spatially separate the hot melt and the piezoelectric transducer. The use of materials with a high heat conduction resistance to construct the ultrasonic waveguide is suitable for limiting the temperature at the piezoelectric transducer with a practical length of the ultrasonic waveguide. The abovementioned document does not contain specific information which goes beyond this and relates to use of the method specifically in high-temperature melts for the purpose of measuring local rates in the melts. It is not possible to measure local rates in the melts with the aid of the propagation time method.

In addition to the methods for measuring the flow rate by means of ultrasound, the ultrasonic Doppler method was also developed for the purpose of measuring rate profiles in technical flows (Y. Takeda: *Development of an ultrasound velocity profile monitor*. Nucl. Eng. Design, Vol. 126, 1991, 277-284). The use of an ultrasonic sensor with an integrated ultrasonic waveguide in the ultrasonic Doppler method requires dispersion-free transmission of the ultrasonic waves in the ultrasonic waveguide. Special requirements are therefore imposed on the structure of the ultrasonic waveguide. The material thickness of the structure carrying the ultrasonic waves must therefore be less than the minimum wavelength of the ultrasonic signal to be transmitted, transversely with respect to the transmission direction. The term "low-dispersion ultrasonic waveguide" is always used below for such ultrasonic waveguides. Various concepts for designing corresponding ultrasonic waveguides are known and are described, for example, in the documents WO 96/41157 and DE 100 21 187 C1.

The document DE 100 53 508 A1 describes the practice of closing the end of a waveguide, which is wound from a film, using suitable disks in order to achieve better coupling with high energy transmission.

In addition to providing a suitably structured ultrasonic waveguide, appropriate precautions for low-loss ultrasound transmission must be taken in order to successfully implement a method for determining local rates in melts at high temperatures using the ultrasonic Doppler method. Problems relating to this arise in a special form in the application mentioned here at high temperatures.

BRIEF SUMMARY OF THE INVENTION

The invention is based on the object of developing a method for carrying out local rate measurements on the basis of the ultrasonic Doppler method in hot melts, in which good signal injection and output is ensured, in particular.

According to the invention, the object is achieved by means of a method for measuring local flow rates in liquid melts above 200° C. using an ultrasound generator and an associated low-dispersion ultrasonic waveguide, in which the material thickness of the structure carrying the ultrasonic waves is less than the minimum wavelength of the ultrasonic signal to be transmitted, transversely with respect to the transmission direction, based on the ultrasonic Doppler method by producing the wettability of the end face of the low-dispersion ultrasonic waveguide before the measuring operation and subsequently directly injecting ultrasonic measurement signals into the melt at an angle which is different from 90° by immersing at least the end face of the low-dispersion ultrasonic waveguide in the melt, and outputting the ultrasonic signals reflected in the melt via the end face of the low-dispersion ultrasonic waveguide and forwarding said signals to an evaluation circuit.

It is advantageous to cool at least the low-dispersion ultrasonic waveguide during the measuring operation.

In a first continuation of the invention, that end face of the low-dispersion ultrasonic waveguide which faces the melt is mechanically and/or chemically freed of dirt and oxides before being immersed in the melt. This may be carried out in a simple manner by means of organic acids.

After the end face of the low-dispersion ultrasonic waveguide has been cleaned, said end face may be provided with a smooth protective layer, the smooth protective layer being able to be applied in the form of a film or cover plate.

In another refinement of the invention, that end face of the low-dispersion ultrasonic transducer which faces the melt can be protected from re-oxidation by applying a protective layer in the meantime.

According to another refinement of the invention, a protective layer made of a material corresponding to the melt to be measured is applied to the end face of the low-dispersion ultrasonic transducer. This may be a metal protective layer.

In order to achieve optimal coupling of the ultrasonic signals, the protective layer is dissolved in the melt at the beginning of or during the measuring operation.

The protective layer may be applied in a simple manner by means of ion implantation or electrochemical or physical methods.

The invention shall be explained in more detail below in an exemplary embodiment. In the associated drawings

DESCRIPTION OF THE INVENTION

Figure 1:
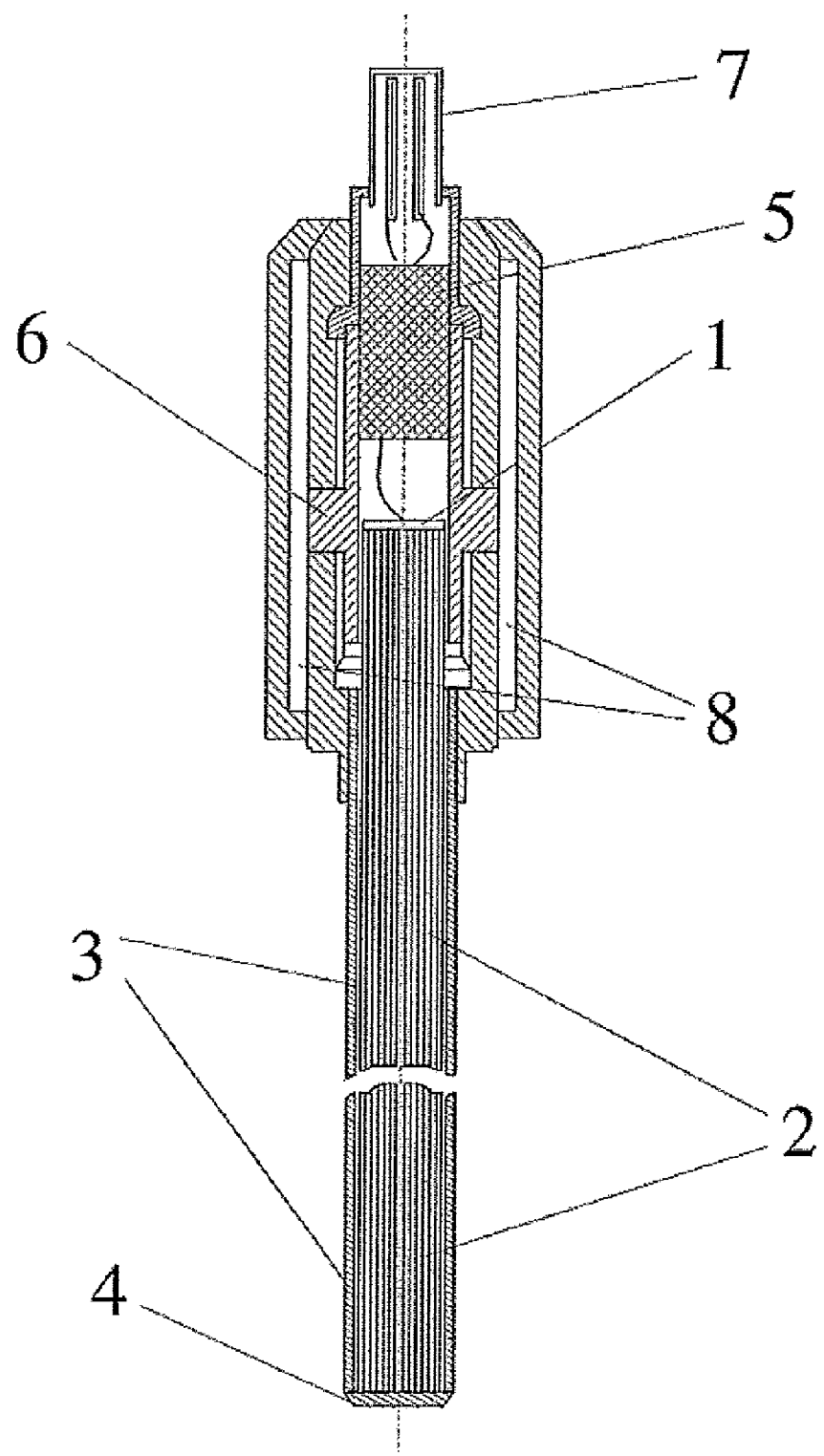
FIG. 1: shows a diagrammatic view of the ultrasonic sensor.

FIG. 1 illustrates the basic structure of an ultrasonic sensor according to the invention which operates according to the ultrasonic Doppler method. This ensures that only one sensor is needed to determine the rate of the flowing melt. The sensor must be immersed in a melt at an angle which is different from 90°. It is possible to use two or more ultrasonic sensors.

The ultrasonic sensor according to the invention consists of the main subassemblies of a piezoelectric transducer 1 with associated electronic components 5 for controlling the transducer 1 and for internally conditioning, matching and evaluating the signals and a low-dispersion ultrasonic waveguide 2 in an axial arrangement. In this case, the piezoelectric transducer 1 is on that side of the low-dispersion ultrasonic waveguide 2 which faces away from the flow. The ultrasonic waveguide 2 is surrounded by a protective sheath 3.

The output signal is applied to a connection socket 7, which is axially downstream of the electronic components 5, and can therefore be transmitted to an evaluation device (not illustrated) outside the sensor via a cable.

The piezoelectric transducer 1 and the electrical signal matching components 5 are accommodated in a protective housing 6.

All of the sensor components inside the protective housing 6 must be permanently kept at a temperature level of less than 100° C. With a corresponding thermal load, the protective housing 6 may be of double-walled design, the intermediate space 8 of the protective housing 6 being able to be connected to a coolant reservoir via corresponding connections, and a coolant being able to flow through said intermediate space during measurement.

Figure 2:
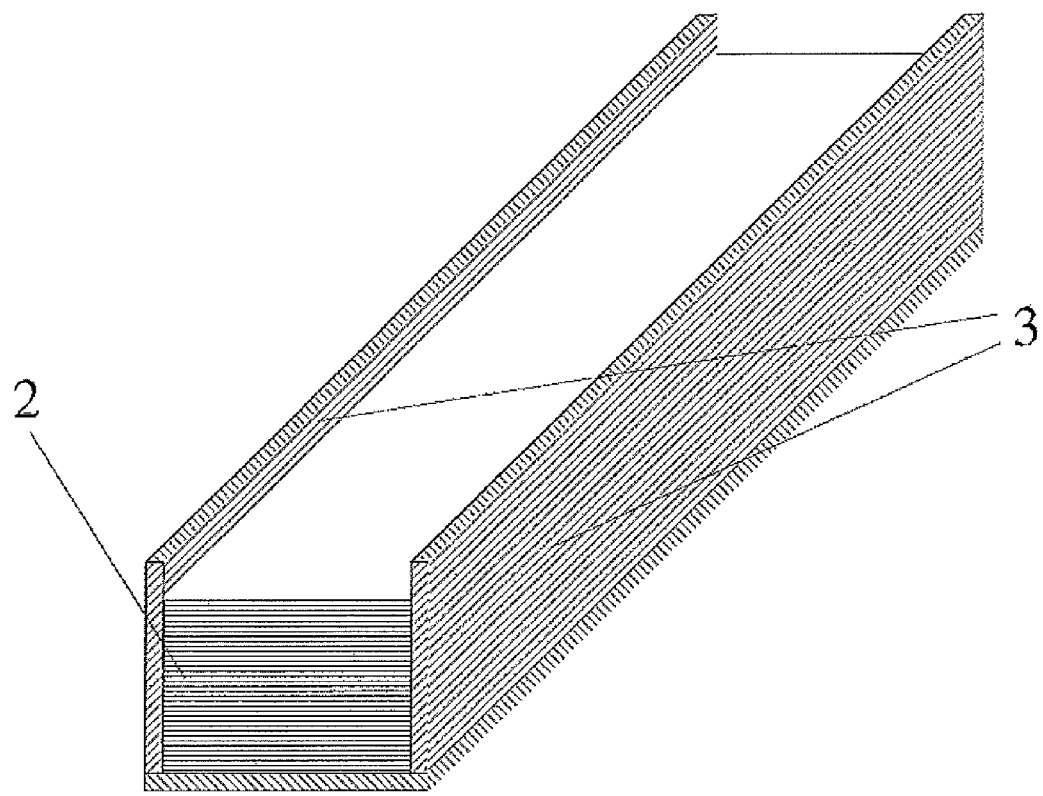
FIG. 2: shows a special design of a low-dispersion ultrasonic waveguide consisting of a multiplicity of individual films which are layered on top of one another.

A special configuration of the low-dispersion ultrasonic waveguide 2 consisting of a multiplicity of metal films which are layered on top of one another in a two-dimensional manner can be seen in FIG. 2. The propagation direction of the ultrasound runs perpendicular to the surface normal of the individual films. The individual film layers each have, for example, a size of 5×300 mm$^2$ with a thickness of 75 μm.

The low-dispersion ultrasonic waveguide 2 is provided with a protective sheath 3 whose shape is matched to the cross section of the ultrasonic waveguide 2. In order to ensure the function of the low-dispersion ultrasonic waveguide 2, that end of the protective sheath 3 of the low-dispersion ultrasonic waveguide 2 which faces the melt may be closed with a cover plate 4 (FIG. 1).

There is a homogeneous material connection between the cover plate 4 and the film layers of the low-dispersion ultrasonic waveguide 2. There is no need for the ultrasonic waveguide 2, the protective sheath 3 and the cover plate 4 to be composed of the same material.

For use in a tin melt at approximately 1000° C., the low-dispersion ultrasonic waveguide 2 may be produced, for example, from a molybdenum film in a stainless steel tube which is closed with a stainless steel cover plate 4 at the front end. In order to produce wetting, which is sufficient for a good acoustic transition, between the ultrasonic sensor and the tin melt, the surface of the stainless steel cover plate 4 is mechanically polished and then treated with phosphoric acid. Tin is then electrolytically deposited on the cleaned surface.

The field of use of a piezoelectric transducer is limited by its Curie temperature. If this temperature threshold is exceeded, the transducer material loses its piezoelectric properties. The melting temperature of a multiplicity of commercially interesting metals, semiconductors or glasses is considerably above the Curie temperature of customary piezoceramics.

Use of the ultrasonic Doppler method in these melts requires a technical solution which establishes stable, acoustic contact between the ultrasonic transducer and the fluid and simultaneously protects the piezoelectric transducer from the affect of the melt to be examined.

Transmission of radio-frequency ultrasonic signals with as little loss as possible is required to an even greater extent in the ultrasonic Doppler method than in the ultrasonic flow measurement methods in order to obtain usable measurement data. As a result of the high temperatures of the melts to be examined, an ultrasonic waveguide is integrated in the measuring concept. However, this is associated with transmission losses which cannot be avoided.

Additional losses arise during the ultrasonic testing of vessel walls, the structure of the wall material of containers for storing hot melts often being distinguished, in particular, by extremely poor ultrasound transmission properties. This results in the need to directly couple the sensor to the flow to be measured directly in the melt. The high application temperatures as well as the direct contact with the melt via the ultrasonic waveguide impose particular requirements on the design of the sensor, in particular on the physical properties of the ultrasonic waveguide material and its chemical stability or solubility in the melt.

It is known that any propagation of sound is accompanied by losses since some of the mechanical energy of the continuous sound wave is continuously converted into heat. This process is referred to as sound absorption and is characterized by the absorption coefficient α which describes an exponential decrease in the sound pressure p of a flat harmonic sound wave along a path x (H. Kuttruff: *Physik and Technik des Ultraschalls*. Hirzel Verlag Stuttgart, 1988, 191 ff.):

$$p(x)=p_0 e^{-\alpha x}$$

The absorption coefficient α depends on the transmission material and the frequency of the ultrasonic wave and is determined by the contributions of different loss mechanisms which stem from the interaction between the propagating wave and the atomic structure of the transmission medium. Parts of the absorption coefficient which can be attributed to sound absorption caused by crystal structure defects, scattering at thermal phonons or similar processes increase as the temperature increases. An increase in the temperature above values of 400° C., for example, already entails a measurable increase in the acoustic attenuation for many materials.

At temperatures above 700° C., it is possible to observe such a drastic increase in the transmission losses that meaningful use of the relevant material as a low-dispersion ultrasonic waveguide can be precluded. Only a small number of ultrasonic waveguide materials which can be carefully selected are therefore suitable for these special applications. The suitability of different materials with regard to their acoustic attenuation behavior at high temperatures was checked in comprehensive series of tests.

It has been found that iridium, molybdenum, niobium, tantalum, tungsten, zirconium, stainless steel, titanium, Monel or alloys of these materials in the range of high temperatures (T>200° C.) have corresponding ultrasound transmission properties which are sufficient for the ultrasonic Doppler method.

An important requirement is for the end face of the low-dispersion ultrasonic waveguide to be sufficiently wetted in order to ensure good acoustic coupling to the melt. If the low-dispersion ultrasonic waveguide is not wetted by the melt, tests have shown that only an insignificantly small part of the ultrasonic energy can be injected into the fluid and no usable measurement signal is produced as a result.

The invention provides different mechanical and chemical processing methods for the end face of the low-dispersion ultrasonic waveguide in order to achieve wetting between the ultrasonic waveguide material and the melt. The number and sequence of the individual processing steps respectively depend on the type of melt in question, the material of the low-dispersion ultrasonic waveguide and the temperature range in which the measurements are intended to be carried out.

An important prerequisite for wetting is the distance of contamination, deposits and oxide layers on the end face of the cover plate 4 of the low-dispersion ultrasonic waveguide 2. This may be effected mechanically, for example by grinding and polishing, and/or chemically by means of a temporally limited effect of suitable chemicals, for example inorganic acids or suitable fluxes.

In the period of time between this preparation and the start of measurement, the cover plate 4 of the low-dispersion ultrasonic waveguide 2 must be protected from re-oxidation and/or contamination in a suitable manner. This may be achieved by means of a suitable protective layer, for example made of a metal, which has been mechanically and/or thermally applied to the end face of the cover plate 4. This protective layer must dissolve in the melt within a predefined period of time during measurement, with the result that direct contact between the melt and the prepared end face of the cover plate 4 is then achieved.

In some material pairings, the ultrasonic waveguide material itself is, in principle, not wetted or is wetted only above a particular temperature with an ideally cleaned surface. For these applications, it is necessary for the end of the cover plate 4 to be covered with a layer of a material which is easily wetted by the melt in the temperature range provided for measurement. There must be a homogeneous material connection between this layer and the low-dispersion ultrasonic waveguide. The additional cover layer may be implemented by fitting a disk or film to the cover plate 4 or by means of electrochemical deposition methods.

Another possibility is to modify the structure of the low-dispersion ultrasonic waveguide near the surface by means of ion implantation or similar physical methods.

Another prerequisite for using a sensor with a low-dispersion ultrasonic waveguide for the ultrasonic Doppler method is the dispersion-free transmission of the ultrasonic wave in the ultrasonic waveguide. In order to achieve this, the low-dispersion ultrasonic waveguide is constructed from a thin structure. This generally entails only incomplete filling of the cross section with material. If, when the low-dispersion ultrasonic waveguide is being immersed in the melt, the latter advances along the cavities into the internal structure of the low-dispersion ultrasonic waveguide, interference-free, low-attenuation transmission is no longer ensured.

In order to prevent this, that end face of the low-dispersion ultrasonic waveguide 2 which faces the melt is closed with the cover plate 4 (already mentioned) and may additionally be designed with a cover plate.

The piezoelectric transducer and the electronic components connected downstream for the purpose of signal matching may generally be permanently exposed to temperatures up to a maximum of 100° C. Therefore, depending on the specific application, it may be necessary to additionally cool these temperature-sensitive sensor components. For this purpose, it is expedient, for example, to accommodate the corresponding components in a protective housing 6 with a double-walled protective sheath 8, a coolant flowing through the cavity of the latter during use.

The signal quality when measuring rates using ultrasonic Doppler methods can be considerably improved by electrically matching the piezoelectric transducer to the evaluation device in a suitable manner. In the present invention, this matching is achieved using an appropriately dimensioned circuit of capacitors and/or coils. The impedance of the piezoelectric transducer 1 should generally be below the characteristic impedance of the cable used to transport signals, with the result that ultrasonic fields are transmitted with a significantly higher intensity in the case of impedance transformation with the aid of coils and capacitors.

The melts to be examined are often heated and fused using induction heaters or electrical heaters with thyristor controllers. This leads to the induction of electrical currents directly in the melt or else in the ultrasonic waveguide 2. The use of electromagnetic pumps or magnetic field systems to influence the flow is a further source of electrical interference signals which may give rise to harmonics and thus impair the measurement result.

The method according to the invention is distinguished by producing the wettability of the end face 4 of the ultrasonic waveguide 1 before the measuring operation and subsequently directly injecting ultrasonic measurement signals into the melt at an angle which is different from 90° by immersing at least the end face 4 of the ultrasonic waveguide 1 in the melt, and outputting the ultrasonic signals reflected in the melt via the end face 4 of the ultrasonic waveguide 1 and forwarding said signals to an evaluation circuit. In this operation, it is expedient to cool at least the low-dispersion ultrasonic waveguide during the measuring operation in order to counteract a deterioration in the transmission behavior.

In this case, the wettability of the end face 4 of the low-dispersion ultrasonic waveguide 2 is produced by mechanically and/or chemically freeing said end face of dirt and oxides before being immersed in the melt. This may be carried out in a simple manner by means of organic acids.

After the end face 4 of the low-dispersion ultrasonic waveguide 2 has been cleaned, said end face may be provided with a smooth protective layer, the smooth protective layer being able to be applied in the form of a film or cover plate.

That end face 4 which faces the melt can also be at least temporarily protected from re-oxidation by applying a protective layer in the meantime.

In order to achieve even better injection of the ultrasonic signals into the melt, a protective layer made of a material corresponding to the melt to be measured can be applied to the end face of the low-dispersion ultrasonic waveguide. This may also be a metal protective layer.

In order to achieve optimal coupling of the ultrasonic signals, the protective layer dissolves in the melt at the beginning of or during the measuring operation.

The protective layer may be applied in a simple manner by means of ion implantation or electrochemical or physical methods.

LIST OF REFERENCE SYMBOLS

1 Piezoelectric transducer
2 Low-dispersion ultrasonic waveguide
3 Protective sheath
4 Cover plate/end face
5 Electrical circuit of the control part and possibly internal evaluation part
6 Protective housing
7 Connection socket
8 Intermediate space/hollow-walled design of the protective sheath

The invention claimed is:

1. A method for measuring the local flow rate in liquid melts in a temperature range above 200° C. using an ultrasound generator and an associated low-dispersion ultrasonic waveguide based on the ultrasonic Doppler method, characterized by
producing the wettability of the end face of the low-dispersion ultrasonic waveguide before the measuring operation,
directly injecting ultrasonic measurement signals into the melt at an angle which is different from 90° by immersing at least the end face of the low-dispersion ultrasonic waveguide in the melt, and
outputting the ultrasonic signals reflected in the melt via the end face of the low-dispersion ultrasonic waveguide and forwarding said signals to an evaluation circuit.

2. The method as claimed in claim 1, characterized in that at least the low-dispersion ultrasonic waveguide is cooled during the measuring operation.

3. The method as claimed in claim 1, characterized in that that end face of the low-dispersion ultrasonic waveguide which faces the melt is mechanically and/or chemically freed of dirt and oxides before being immersed in the melt.

4. The method as claimed in claim 3, characterized in that the end face is cleaned by means of organic acids.

5. The method as claimed in claim 1, characterized in that the end face of the low-dispersion ultrasonic waveguide is provided with a smooth protective layer.

6. The method as claimed in claim 5, characterized in that the smooth protective layer is applied in the form of a film or cover plate.

7. The method as claimed in claim 1, characterized in that that end face of the low-dispersion ultrasonic transducer which faces the melt is protected from re-oxidation by applying a protective layer in the meantime.

8. The method as claimed in claim 7, characterized in that a protective layer made of a material corresponding to the melt to be measured is applied to the end face of the low-dispersion ultrasonic transducer.

9. The method as claimed in claim 7, characterized in that a metal protective layer is applied to the end face.

10. The method as claimed in claim 5, characterized in that the protective layer is dissolved in the melt at the beginning of or during the measuring operation.

11. The method as claimed in claim 5, characterized in that the protective layer is applied by means of ion implantation or electrochemical or physical methods.

* * * * *